Feb. 29, 1944.  R. S. BASSETT  2,342,997

LIQUID METER

Filed May 19, 1942

INVENTOR
Robert S. Bassett
by Parker, Rockwood & Farmer
ATTORNEYS

Patented Feb. 29, 1944

2,342,997

UNITED STATES PATENT OFFICE 2,342,997

LIQUID METER

Robert S. Bassett, Buffalo, N. Y.

Application May 19, 1942, Serial No. 443,556

4 Claims. (Cl. 73—232)

This invention relates to meters for measuring liquid volumes and particularly to meters for use in measuring motor fuel which may be dispensed intermittently and at varying rates of flow and to meters which are required to actuate a register.

When a meter is called upon to actuate a register of the type commonly employed in motor fuel dispensing apparatus, the accuracy of the meter is decreased due to the fact that the meter must overcome the friction and other resistance incident to the actuation of the register.

One of the objects of this invention is to provide means of improved construction whereby the meter is relieved of most of the work required for actuating the register.

Another object of this invention is to provide a device of this kind in which a motor driven by the liquid to be dispensed is mechanically connected with the measuring unit in such a manner that a constant speed ratio will be maintained between the motor and the measuring unit.

It is also an object of this invention to provide in a device of this type a pressure relief valve which will prevent damage to the parts of the meter under certain operating conditions.

A further object of this invention is to provide a meter of this kind in which the discharge port of the motor and the inlet port of the measuring unit are connected so that liquid discharged from the motor may pass to the measuring unit, and in which a small constantly open bleeder passage is provided for conducting from the meter a small portion of the liquid discharged from the motor before it passes to the measuring unit.

Other objects and advantages of this invention will appear from the following description and claims.

Figure 1:
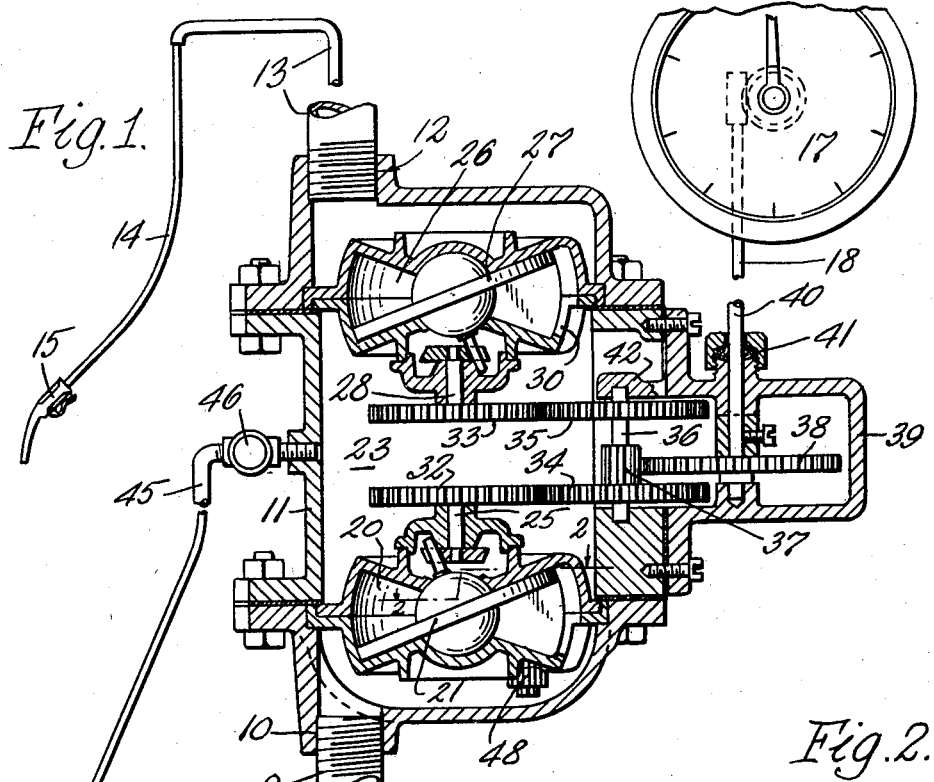
Fig. 1 is a central sectional elevation of a meter showing diagrammatically the parts with which the meter is connected for dispensing motor fuel.
Figure 2:
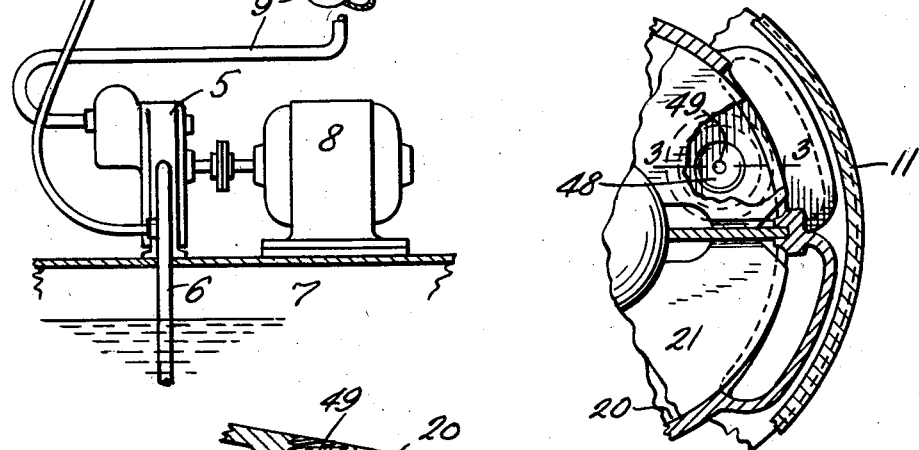
Fig. 2 is a fragmentary sectional plan view thereof, on line 2—2, Fig. 1.
Figure 3:
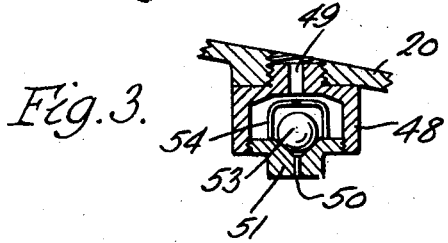
Fig. 3 is a fragmentary sectional elevation thereof, on line 3—3, Fig. 2.

The meter is shown in the accompanying drawing as applied to motor fuel dispensing apparatus including a pump 5 having an inlet duct 6 extending into a tank 7 in which the liquid to be dispensed is contained. The pump 5 may be driven in any suitable manner, for example, by means of an electric motor 8 and the discharge of the pump is connected by means of a duct 9 to the inlet opening 10 of a meter housing 11. This housing also has a discharge opening 12 connected by means of a tube 13 to a flexible hose 14, the discharge end of which is provided with the usual hand operated valve 15 which controls the discharge of liquid. 17 represents diagrammatically a register actuated by means of a shaft 18 driven by the meter in accordance with the volume of liquid discharged through the valve 15.

The housing of the meter may be formed in a number of parts suitably secured together to facilitate the assembling of the various parts of the meter within the housing.

It is desirable to provide a motor adjacent to the inlet port or opening of the housing, which will be driven by the liquid which has entered the meter and which is intended to carry the greater portion of the load necessary to actuate the register 17. This motor may be of any suitable or desired type, and in the particular construction illustrated, this motor is in the form of a measuring unit commonly employed in liquid meters. This motor unit has a chamber 20 of any desired construction in which a nutating piston or disk 21 is arranged in the usual manner, so that it acts as a measuring unit also. The chamber 20 of the motor is provided with the usual inlet and discharge ports and is so mounted in the housing 11 that all liquid entering the inlet opening, except as hereinafter explained, must pass through the chamber of the motor in order to enter the intermediate or connecting portion 23 of the housing.

The nutating disk or piston 21 actuates a shaft 25 in the usual manner, the rotation of this shaft being approximately proportional to the liquid passing through chamber 20.

Adjacent to the discharge end of the housing 11 a measuring unit is provided. This measuring unit may also be of any suitable or desired construction, that shown having a measuring chamber 26 and a nutating piston or disk 27 actuating a measuring unit shaft 28. In the construction shown, chambers 20 and 26 of the two units are substantially similar in capacity. Upper measuring unit 26 receives liquid from the intermediate or connecting portion 23 of the housing through an inlet port 39 and discharges liquid which has passed through the measuring chamber 26 into the upper portion of the housing for discharge to the discharge opening 12 of the housing. Upper measuring unit 26 is also so mounted in the housing 11 that no liquid can pass from the intermediate portion 23 of the housing to the discharge port 12 except by first passing through the measuring chamber 26. The ports of the measuring chamber 26 are so arranged that the shaft 28 of the upper measuring unit is rotated in the same direction of rotation as the shaft 25 of the motor.

Any suitable or desired means may be provided for connecting the shafts 25 and 28 of the two units in such a manner that any movement of one unit is proportionately transmitted to the other unit. In the particular construction illustrated by way of example for this purpose, the shafts 25 and 28 have rigidly secured thereto gears 32 and 33 and these gears mesh with gears 34 and 35 which are fixedly mounted on a common shaft 36. This common shaft carries a pinion 37 meshing with a gear 38 arranged in an extension 39 of the housing of the meter. The gear 38 is fixedly mounted on a shaft 40 which may be integral with the shaft 18 or suitably connected therewith to actuate the register 17.

A stuffing box 41 may be provided on the housing extension 39 to prevent the escape of liquid from the meter housing along the shaft 40. Any other driving connection for establishing a fixed speed ratio between the two units, for driving the register 17 from these units may be provided, if desired. The housing extension 39 may be provided with an arm 42 extending into the main housing 11 of the meter and forming a bearing support for the upper end of the shaft 36.

The gearing connecting the shafts 25 and 28 may be such as to cause these two shafts to operate at identically the same speed, or if desired, the gear ratio may be other than 1:1, and this can easily be done by varying the number of teeth in one or more of the gears of the gear train. The exact ratio desired between the two shafts 25 and 28 may vary under different operating conditions and with different meters and the ratio may vary as much as 10% either way, when the two units are of substantially the same size. If the two units differ from each other in size, the gear ratio must be changed accordingly. The two units operate differently when the liquid passes through the meter at a low rate of speed than they do when the flow of liquid through the meter is rapid, and hence the gear ratio between the two units is preferably such that the meter on the average will be as accurate as possible, under the varying rates of flow to which it is subjected.

It is desired to operate the meter so that the motor at the inlet portion of the housing will carry the main load of driving the register. When this is done, it will be obvious that leakage past the edges of the nutating disk and past other relatively movable parts of the motor unit will be greater than the corresponding leakage in the measuring unit. Because of this difference in leakage in the two units, which would admit into the intermediate part 23 of the housing more liquid than is withdrawn by the upper measuring unit, I provide means for withdrawing from the intermediate or connecting portion 23 of the housing such excess liquid. In the construction illustrated by way of example in Fig. 1, I have shown a bleeder passage, such for example as a small tube or duct 45, one end of which is connected with the intermediate portion 23 of the housing 11 and the other end of which is connected to the suction or intake pipe 6 of the pump 5. The flow of liquid through this bleeder tube may be controlled in any suitable or desired manner, such as by selecting a bleeder tube of the correct size, or if desired, a valve 46 may be employed in the bleeder tube or passage, and which may be manually adjusted to provide the desired amount of flow from the connecting portion 23 of the meter. The amount of liquid passing through the bleeder passage 45 may also depend upon the gear ratio between the shafts 25 and 28.

As a result of the construction described, the motor unit will tend to exert more torque on the gear train or other connection between the two units than the upper measuring unit. Under ideal conditions, this tendency on the part of the motor should be just sufficient to supply the torque to the register 17 so that none of this torque need be supplied by the upper measuring unit which, consequently, will operate at a high degree of accuracy. The construction described has the advantage that by providing a fixed gear ratio between the two units, a comparatively simple construction is provided, such as a simple gear train connecting the shafts 25 and 28.

Under certain conditions of flow of the liquid through the meter, the second measuring unit in the measuring chamber 26 may tend to operate to drive the first motor, thus driving the piston 21. Under such conditions, a pressure lower than usual may occur in the intermediate or connecting portion 23 of the housing because of the suction of the bleeder passage 45, and this change in pressure differential may damage the gear train or the units.

I have, therefore, provided a relief valve on the motor which is capable of admitting liquid from the inlet portion of the housing to the discharge portion of chamber 20 without requiring such liquid to act on the nutating disk or piston 21, to provide the amount withdrawn by the bleeder passage 45. This valve may be of any suitable or desired construction, that shown in the drawing including a valve housing 48 which may be secured to the lower wall of the measuring chamber 20 adjacent to the discharge port thereof, and the relief valve housing has a passage 49 communicating with the interior of this portion of the measuring chamber 20. The housing also has a relatively small inlet passage 50 which is preferably formed on a cap member 51 adapted to be secured to the housing 48 and the inner end of the passage 50 is controlled by means of a suitable valve 53. In the construction illustrated, I have provided a ball valve and the ball is preferably of such size as to resist flow of liquid through the passage 50 until a material difference in pressure exists between the inlet portion of the housing and the intermediate or connecting portion 23. The weight of the ball 53 may be depended upon for this purpose, or the valve member may be yieldingly urged into its seating position at the discharge end of the passage 50 by any other suitable or desired means. 54 represents a cage for holding the ball 53 in place. This relief valve 53 bypasses liquid when the leakage past the motor is less than the quantity of liquid passing through the bleeder passage. Preferably, the relief valve will not open until a difference in pressure of about five pounds per square inch exists between the inlet portion of the housing and the connecting portion 23, but this pressure may be varied materially, providing, of course, that this relief valve remains closed during normal operation of the motor. The excess liquid admitted into the intermediate portion 23 of the meter through the relief valve will be withdrawn through the bleeder passage 45. The relief valve will, consequently, improve the accuracy of the meter, since it will take care of the possibility of having the upper measuring unit drive the register 17.

By means of the construction described, a high degree of accuracy in measuring liquids at varying rates of flow results, since the motor unit provides the torque necessary for actuating the register 17, and consequently, the measuring unit will operate with the minimum of leakage and high accuracy. Since the two units are connected to operate at a fixed ratio, the register will be driven by the motor unit, but under the control of the measuring unit.

I claim as my invention:

1. A liquid meter for use with a pump delivering liquid thereto, and having an outlet passage and a suction passage through which liquid is drawn to the pump, said meter comprising a housing having an inlet opening to which liquid is supplied by said pump, and a discharge opening, a liquid measuring unit in said housing which is driven by liquid from said inlet opening, a second measuring unit discharging liquid to said discharge opening, means for conducting liquid discharged from said first unit to said second unit, a gear train connecting said measuring units to cause each movement of one unit to be transmitted in a definite fixed ratio to the other unit, a register actuated by said units through said gear train, a constantly open bleeder passage for withdrawing from said conducting means a small amount of liquid and which is connected to the suction passage of said pump, and a manually operable valve for regulating the discharge of liquid through said bleeder passage, whereby the first of said units normally acts as a driving motor for actuating said register at a rate controlled by said second unit.

2. A liquid meter for use with a pump delivering liquid thereto, and having an outlet passage and a suction passage through which liquid is drawn to the pump, said meter comprising a housing having an inlet opening to which liquid is supplied by said pump, and a discharge opening, a motor driven by liquid from said inlet opening, a measuring unit receiving liquid from said motor and discharging the same to said discharge opening, said motor and said measuring unit having shafts rotating approximately proportional to the volume of liquid passing therethrough, gears secured on said shafts, gears secured on a common shaft and arranged in driving relation to said first mentioned gears, said last mentioned gears and common shaft causing each movement of said motor to be proportionately transmitted to said measuring unit, a register operated from said common shaft, and a constantly open bleeder passage for withdrawing from said meter a small portion of the liquid discharged by said motor before the same passes to said measuring unit and which is connected to the suction passage of said pump.

3. A liquid meter comprising a housing having inlet and discharge openings, a motor in said housing driven by liquid from said inlet opening, a measuring unit discharging liquid to said discharge opening, and operated by means of liquid discharged from said motor, a driving connection between said motor and said measuring unit for causing said motor and said unit to be rotated in fixed speed ratio relatively to each other, a register actuated by said motor, a small constantly open bleeder passage for withdrawing some of the liquid discharged by said motor before the same passes to said measuring unit, and a relief valve arranged to bypass liquid around said motor from said inlet to the discharge of said motor when the leakage past said motor is less than the quantity of liquid passing through said bleeder passage.

4. A liquid meter comprising a housing having inlet and discharge openings, a liquid measuring unit discharging liquid to said discharge opening, another liquid measuring unit in said housing actuated by liquid entering said inlet opening and having a measuring chamber provided with a discharge port connected with said first mentioned measuring unit to deliver liquid thereto, a driving connection between said measuring units to cause every movement of one unit to be in a constant fixed ratio to the movement of the other unit, a register actuated by said units, a small constantly open bleeder passage for withdrawing liquid discharged by said second unit before reaching said first unit, and a relief valve in said measuring chamber of said second unit adjacent to the discharge port thereof, for admitting thereto liquid which had just entered said housing from said inlet opening when the leakage past said second named measuring unit is less than the quantity of liquid passing through said bleeder passage.

ROBERT S. BASSETT.